No. 642,658. Patented Feb. 6, 1900.
L. E. WHITON.
LATHE CHUCK.
(Application filed Jan. 16, 1899.)
(No Model.)

WITNESSES

INVENTOR,
Lucius E. Whiton,
BY
Frank H. Allen
ATTORNEY.

United States Patent Office.

LUCIUS E. WHITON, OF NEW LONDON, CONNECTICUT.

LATHE-CHUCK.

SPECIFICATION forming part of Letters Patent No. 642,658, dated February 6, 1900.

Application filed January 16, 1899. Serial No. 702,229. (No model.)

*To all whom it may concern:*

Be it known that I, LUCIUS E. WHITON, a citizen of the United States, residing at New London, in the county of New London, State of Connecticut, have invented certain new and useful Improvements in Chucks, of which the following is a full, clear, and exact description.

The immediate aim of this invention is to so improve "scroll" lathe-chucks that the jaws may be independently adjusted. This is sometimes necessary in order that irregular pieces may be accurately centered and held by the chuck and is occasionally desirable in order that work which has been previously finished may be held perfectly true in the chuck by the previously-finished surface.

In perfecting my invention I have planned to make the parts of simple form in order that they may be easily and cheaply produced and readily assembled.

My invention is illustrated by the annexed sheet of drawings.

Figure 1:
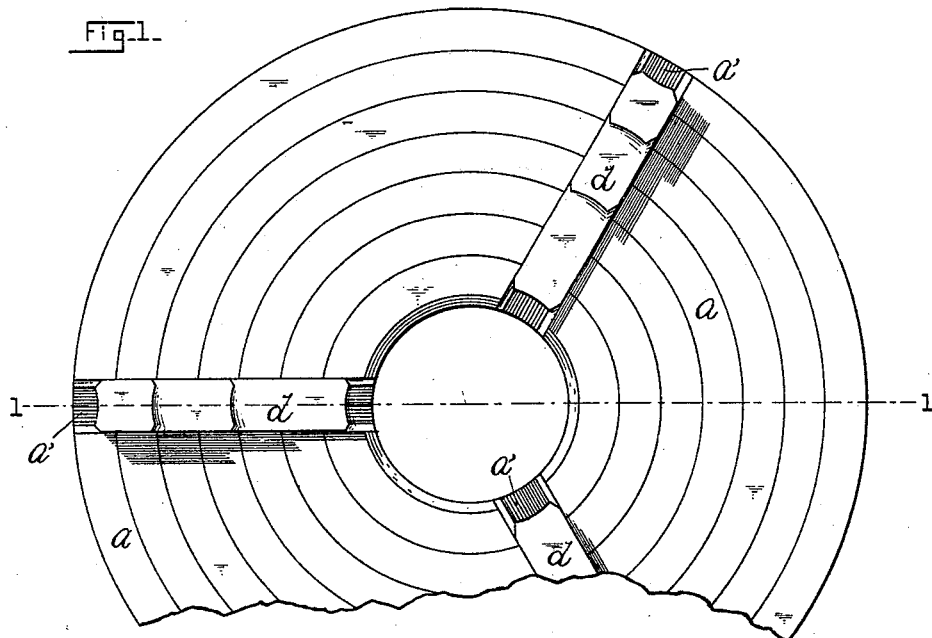
Figure 2:
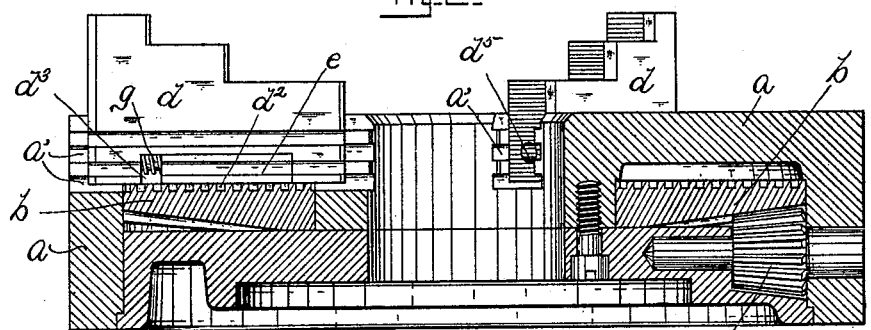
Figure 4:
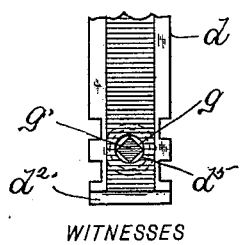
Figure 3:
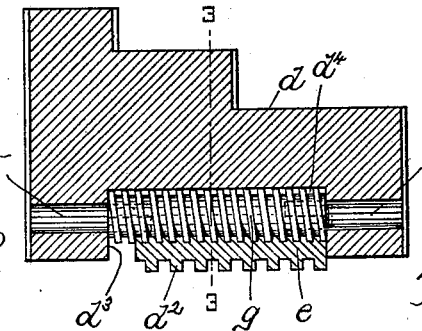
Figure 5:
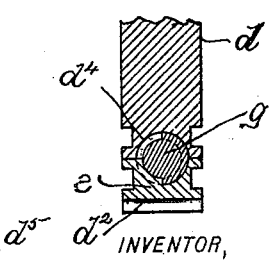

Figure 1 is a plan view of the major part of a chuck embodying my improvements. Fig. 2 is a cross-sectional view of the same, taken on line 1 1. Fig. 3 is a central longitudinal sectional view of one of the chuck-jaws on a somewhat enlarged scale. Fig. 4 shows in elevation that portion of the said jaw that lies in the body of the chuck, and Fig. 5 is a cross-sectional view on the line 3 3.

The reference-letter $a$ denotes the body or shell of the chuck; $b$, the scroll-section, mounted and adapted to rotate in said shell, and $c$ denotes a bevel-gear engaging the radially-toothed rear face of the scroll-section, the elements thus far referred to being of the usual construction and arrangement.

The jaws $d$ are fitted to slide in radial undercut ways $a'$ in the shell $a$ in the usual manner; but the means provided for connecting the scroll and the jaws forms the novel feature of my invention.

By reference to the drawings, particularly to Figs. 2 and 3, it will be seen that the teeth $d^2$ that coact with the scroll are not cut upon the main or body portion of the jaw, but are formed on the inner edge of an independent slider $e$, and to receive said piece the bottom of the jaw is notched out, as at $d^3$, and is formed with a semicircular recess $d^4$ to receive a screw $g$, which fits snugly endwise in the recess $d^4$. The slider $e$ is formed on its side opposite the scroll-engaging teeth $d^2$ as a half-nut that engages the teeth of the screw $g$. (See Fig. 5.) The slider $e$ is somewhat shorter than the recess $d^3$, in which it is located, so that when the screw $g$ is rotated the jaw will be caused to travel longitudinally on the slider within the limits of the said recess. The body portion $d$, screw $g$, and slider $e$ thus combined form the complete jaw, and under all ordinary conditions they preserve the same positions relatively to each other and travel together—that is to say, when the slider $e$ is moved outward or inward by the scroll $b$ the slider, screw, and jaw move as if they were a single structure; but if it should become necessary or desirable to vary the position of the work-holding part of the jaw it may be quickly and effectively done by simply rotating the screw $g$, and thus changing the position of said jaw with respect to the slider and with respect to the other jaws. The ends of screw $g$ are formed with angular holes or sockets $g'$ to receive a wrench, which latter is introduced through holes $d^5$ in the body portion $d$.

Referring to the drawings, it will be seen that the opposite faces of the slider $e$ are properly constructed to travel in the undercut ways $a'$, together with the main portion $d$ of the jaw, and it will also be seen that said main portion $d$ may be reversed upon the slider $e$ to utilize either end of the jaw for holding the work. It should also be noted that my improvements change in no way the construction of the body of the chuck, but relate solely to the jaws, said improvements being of such a nature that a set of jaws embodying the same may be used in an ordinary chuck-body, or the old jaws may be notched and the described sliders and adjusting-screws added with slight expense.

The described arrangement of slider, screw, and jaw renders it possible to adjust one or more of the jaws to hold pieces that are slightly irregular in shape.

My improvements add very little to the first cost of a chuck of this class, yet they add very much to the convenience, efficiency, and lifetime of such chucks.

Having described my invention, I claim—

In combination with a reversible chuck-jaw notched as set forth, an adjustable scroll-engaging slider located in said notch, and a screw operatively connected with the slider; said screw being confined between the end walls of the notch, and the chuck-jaw being reversibly mounted on the slider and screw.

Signed at New London, Connecticut, this 28th day of December, 1898.

LUCIUS E. WHITON.

Witnesses:
ALONZO M. LUTHER,
FRANK H. ALLEN.